United States Patent [19]

Mathieu

[11] 4,204,150
[45] May 20, 1980

[54] APPARATUS AND METHOD FOR REGULATING THE POWER FACTOR IN AN ELECTRICAL DISTRIBUTING-NETWORK LINE

[75] Inventor: Serge Mathieu, Ste-Foy, Canada

[73] Assignee: H.O.P. Consulab Inc., Quebec, Canada

[21] Appl. No.: 951,955

[22] Filed: Oct. 16, 1978

[30] Foreign Application Priority Data

Jun. 20, 1978 [CA] Canada .................................. 305891

[51] Int. Cl.² .............................................. H02J 3/18
[52] U.S. Cl. .................................... 323/102; 323/105; 323/128
[58] Field of Search ............... 323/101, 102, 105, 108, 323/121, 128

[56] References Cited

U.S. PATENT DOCUMENTS

| | | | |
|---|---|---|---|
| 3,300,712 | 1/1967 | Segsworth | 323/105 |
| 3,703,680 | 11/1972 | Frank et al. | 323/101 |
| 3,940,687 | 2/1976 | Akhundov et al. | 323/101 |
| 4,055,795 | 10/1977 | Mathieu | 323/128 X |

*Primary Examiner*—William M. Shoop

*Attorney, Agent, or Firm*—Cushman, Darby & Cushman

[57] ABSTRACT

The specification discloses an apparatus and a method for regulating the power factor in an electrical distributing-network line; according to one embodiment of the invention, the active line power is measured by means of a transducer, the output from which is a continuous voltage proportional to the active power supplied by the line; the reactive power of the line is then measured by means of a second transducer, the output from which is also a continuous voltage proportional to the reactive power supplied by the line; the voltage supplied by the active-power transducer is then divided by voltage dividers in order to obtain two reference voltages $L_1$, $L_2$, the values of which indicate the fixed limits for the line power factor; the voltage supplied by the reactive-power transducer is then compared with reference voltages $L_1$, $L_2$ for the purpose of obtaining two logic levels indicating one of the three following operations: one or more capacitors are connected if the power factor is below the limit $L_1$ and is inductive; one or more capacitors are disconnected if the power factor is above the limit $L_2$ and is inductive; no action is taken if the power factor is above the limit $L_1$ and below the limit $L_2$ and is inductive.

18 Claims, 6 Drawing Figures

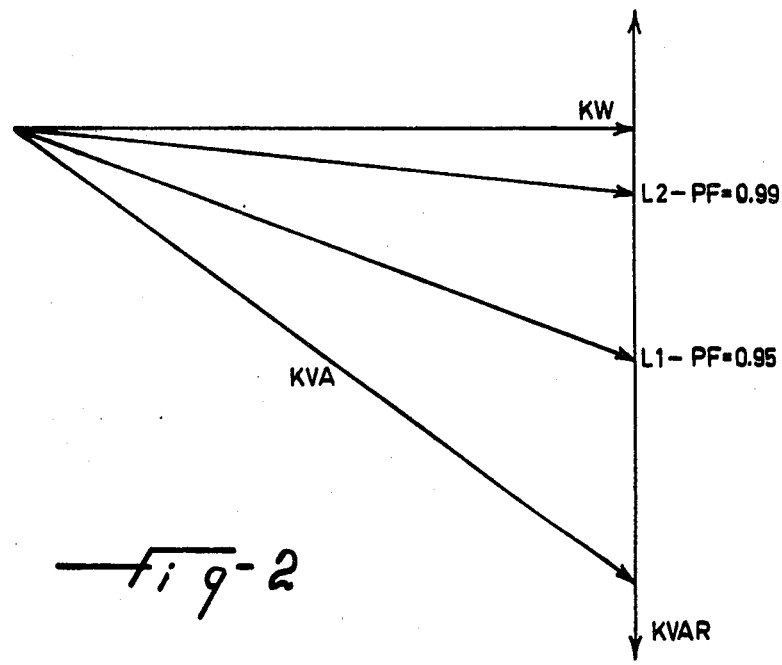

APPARATUS AND METHOD FOR REGULATING THE POWER FACTOR IN AN ELECTRICAL DISTRIBUTING-NETWORK LINE

The object of the present invention is an apparatus and a method for regulating the power factor in an electrical distributing-network line.

It is known that in an industrial electrical installation having a large number of inductive loads, the power factor may easily be below 70%. Since many companies providing electrical service impose a surcharge whenever the power factor is below 90%, it would appear to be useful and profitable to establish a corrective system to keep the power factor within reasonable limits, in order to avoid paying this surcharge.

There are two known ways of regulating the power factor. The first is by introducing capacities into the transmission lines; the second is by simulating these capacities by means of a synchronous motor, one winding of which is overexcited by direct current. These two ways are in common use. The second is used mainly in cases where the number of reactive Kva has to be very large.

It is therefore an object of the present invention to regulate the power factor in a single-phase or three-phase electrical distributing network. According to the invention, this system uses appropriate transducers to measure the active and reactive power supplied by the network, determines, by means of suitable circuitry, whether the power factor is above, below, or within acceptable limits and, then, depending on the circumstances, connects or disconnects capacitors in the correct sequence, thus keeping the power factor within the limits specified by the user.

The present invention is therefore concerned with a method of regulating the power factor in an electrical distributing-network line, the method consisting, in its broadest aspect, in (a) measuring a first component of the power in the line by means of a transducer, the output from which is a continuous voltage proportional to this component of the power supplied by the line;

(b) measuring a second component of the power in the line by means of a transducer, the output from which is a continuous voltage proportional to this component of the power supplied by the line;

(c) dividing the voltage supplied by the transducer of the first component by means of voltage dividers, for the purpose of obtaining two reference voltages $L_1, L_2$, the values of which represent the limits specified for the power factor in the line;

(d) comparing the voltage supplied by the transducer of the second component with reference voltages $L_1, L_2$ in order to obtain two logic levels indicating one of the three following operations:

(i) connecting one or more capacitors if the power factor is below the limit $L_1$ and is inductive;

(ii) disconnecting one or more capacitors if the power factor is above the limit $L_2$ and is inductive;

(iii) taking no action if the power factor is above the limit $L_1$, and below the limit $L_2$ and is inductive.

The present invention also relates to an apparatus for the execution of the said method.

According to one preferred embodiment of the invention, the active power of the line is measured in watts, after which the reactive power thereof is measured in vars. It is also possible, however, to use a single transducer to measure both watts and vars since a vars transducer is actually a watts transducer, the input potentials of which are 90° out of phase. Another configuration of the invention uses a volt-amperes transducer and a watts transducer. Finally, it is also possible to use a volt-amperes transducer and a vars transducer.

The invention will be better understood from the description given hereinafter, in conjunction with preferred embodiments of the invention illustrated in the drawings attached hereto, wherein:

FIG. 2 is a vectorial representation of the variables describing the power factor;

FIG. 3 is a possible design of a portion of the block diagram in FIG. 1;

A proper understanding of the invention requires, first of all, a review of FIG. 2. This is a well-known vectorial representation of the variables affecting the power factor. Assuming that the power factor in an electrical distributing network is to be kept within two specific limits shown in FIG. 2, as $L_1$ and $L_2$, to which have been assigned the arbitrary values of a power factor of between 95 and 99%, then according to FIG. 2:

for $L_1$:
$$VARS/WATTS = Tg \cos^{-1} L_1$$

$$VARS = (Tg \cos^{-1} L_1)(watts),$$

and similarly for $L_2$:
$$VARS = (Tg \cos^{-1} L_2)(watts).$$

Thus, in order to keep the power factor between $L_1$ and $L_2$, the following obtains:
$$(Tg \cos^{-1} L_1)(watts) > VARS > (Tg \cos^{-1} L_2)(watts).$$

To be more explicit, this means that if the network power factor is to be above $L_1$, the vars supplied by the network must be less than a certain proportion of the watts supplied by the network. This may be demonstrated by carrying out the complete calculation for $L_1 = 0.95$ and $L_2 = 0.99$, which gives the following:

$$VARS < (Tg \cos^{-1} L_1)(watts)$$

$$VARS < 0.329 \text{ watts}$$

$$VARS > (Tg \cos^{-1} L_2)(watts)$$

$$VARS > 0.142 \text{ watts}$$

Generally speaking:

$$K_1 \text{ watts} > vars > K_2 \text{ watts}$$

Since the purpose of the system is to regulate the power factor at a relatively high value, constants $K_1$ and $K_2$ are always less than 1. Actually, a constant $K_1$ equal to 1 corresponds to a power factor of 70.7%, and the system may be used commercially for power-factor values above 85%. It is therefore possible to replace constants $K_1$ and $K_2$ respectively by $1/N_1$ and $1/N_2$, wherein:

$$N_1=1/K_1 \text{ and } N_2=1/K_2$$

which becomes:

$$Watts/N_1 > Vars/ > Watts/N_2$$

wherein $N_1$ and $N_2$ are greater than 1.

Reverting to the previous example, it appears that in order to keep the network power factor between 95 and 99%, the following must obtain:

$$Watts/3.942 > Vars/ > Watts/7.018$$

Figure 1:
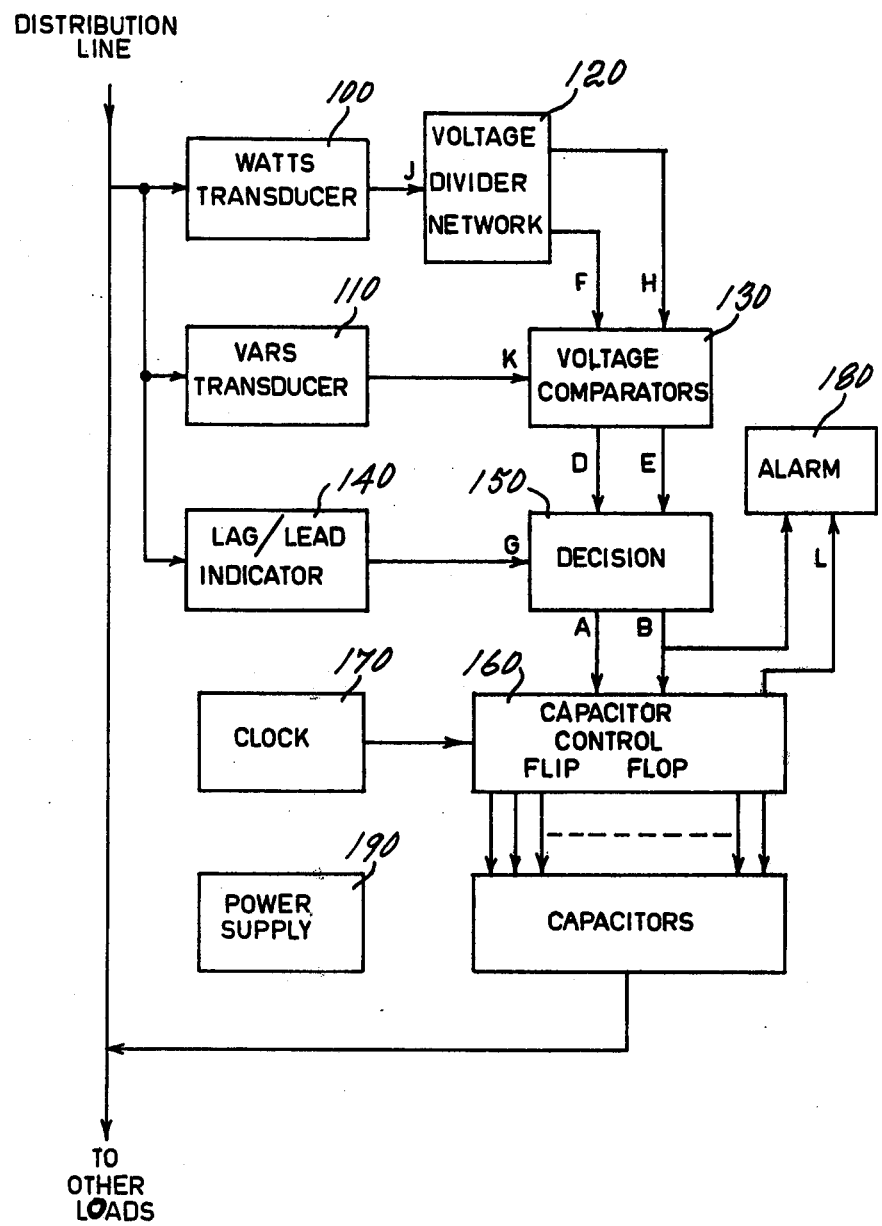
FIG. 1 is a block diagram of system for regulating the power factor in an electrical distributing-network line.

With reference to FIG. 1, it is now possible to deduce the operation of the system for regulating the power factor in a distributing-network line by initially measuring the active power in watts of the network by means of an appropriate transducer 100, the output J from which is a continuous voltage proportional to the active power supplied by the network. The reactive power in vars of the network is then measured by means of a suitable transducer 110, the output K from which is a continuous voltage proportional to the reactive power supplied by the network. The voltage supplied by the watts transducer is divided by block 120 in order to obtain two reference voltages using points $L_1$ and $L_2$ in FIG. 2. According to the configuration of the invention illustrated in FIG. 3, block 120 may contain two potentiometers 122, 124 which are suitably graduated (for example from 70.7 to 100%). Reference voltages $L_1$ and $L_2$ find their way to outputs F and H from block 120. Each of the two voltage dividers in block 120 may consist of any other suitable system. Block 130 contains two voltage comparators 132 and 134 which compare output voltage K from the vars transducer with voltages H and F representing respectively points $L_1$ and $L_2$ in FIG. 2. The outputs from these two comparators constitute signals D and E. Signal D indicates the result of the comparison of the vars measured and indicated by signal K with the limit $L_2$ as represented by signal F. Signal E indicates the result of the comparison of the vars measured and indicated by signal K with the limit $L_1$ as represented by signal H.

The result of this comparison in block 130 supplies, by means of a NAND gate 152 and a NOR gate 154, two logic levels A and B indicating one of the following three operations:

(i) if the power factor is below limit $L_1$ and is inductive, one or more capacitors must be connected;

(ii) if the power factor is above limit $L_2$ and is inductive, one or more capacitors must be disconnected;

(iii) if the power factor is above limit $L_1$ and below limit $L_2$, and is inductive, the system must perform no operation.

Provision should also be made in block 150 to ensure that, if the power factor becomes capacitive, one or more capacitors are disconnected regardless of the value of the power factor in relation to the limits established.

The system described above may make use of one of the two means commonly used to regulate the power factor: i.e. by connecting or disconnecting capacitors in the network line, or by simulating these capacitors by means of a synchronous motor, one winding of which is over-excited in direct current. For greater simplicity, however, this present text will deal only with the regulation of the power factor by capacitive loads, which is the most frequent case.

It should be noted that the combination of blocks 100, 110, 120 and 130 is sufficient to provide, in most cases, an indication of the operation to be carried out, i.e. the connecting or disconnecting capacitors. The presence of blocks 140 and 150 in FIG. 1 is merely a refinement of the present invention, the purpose of which is to deal with a condition which is possible but highly unlikely in practice. For instance, assuming that a system is keeping the power factor between limits $L_1$ and $L_2$ and that, to this end, voltage has been applied to a certain number of capacitors, then, if at this moment there is a sudden decrease, of sufficient amplitude, in the active power supplied by the network, it is possible, since the system has not had enough time to react, for the power factor to drop below limit $L_1$ and, at this time, to be capacitive. It is obvious that, under these circumstances, signals D and F will indicate a need to connect capacitors (since the actual power factor is below that allowed by limit $L_1$), whereas the reverse operation should be carried out. The purpose of block 140 is therefore to determine whether the power factor has become capacitive, and the purpose of block 150 is to combine signals D and E with signal G, for the purpose of avoiding the possible condition described above.

Block 160 in FIG. 1 comprises electronic flip-flops (not shown), the purpose of which is to connect or disconnect the capacitors in sequence. The purpose of block 170 is to provide block 160 with a real-time clock which determines the period of each operation of block 160. Signals A and B in FIG. 1 control the operations of block 160, while signal L indicates the moment at which all available capacitors have been energized.

Signal L, in conjunction with signal B, may be used to initiate an alarm, since signal B indicates that block 160 should add capacitors and signal L indicates that all capacitors have been energized. This condition indicates, therefore, that there are not enough capacitors or that fuses have been burned out. Signals B and L are combined in block 180 in FIG. 1.

The purpose of block 190 is to provide the system with the power required for its operation. Block 200 in the same figure contains capacitors which are connected to the distributing line, thus closing a reverse-feedback loop. As already indicated hereinbefore, these capacitors may be replaced by a synchronous motor.

Figure 4:
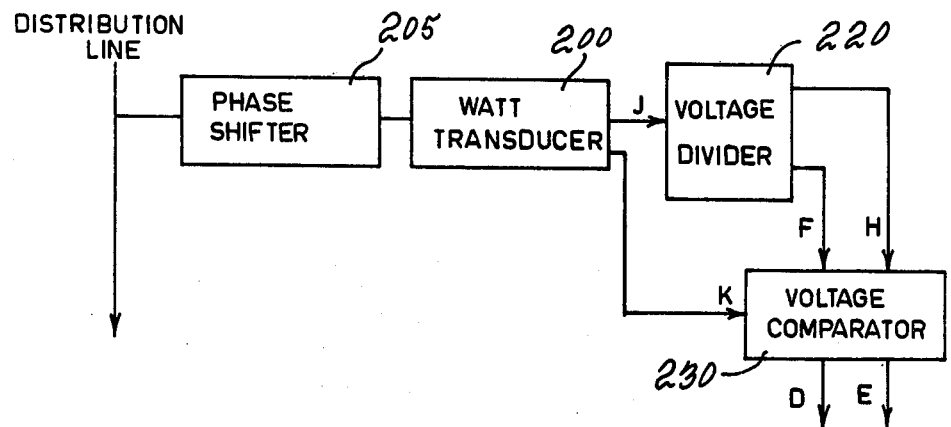
FIG. 4 is a second embodiment of the invention.
Figure 5:
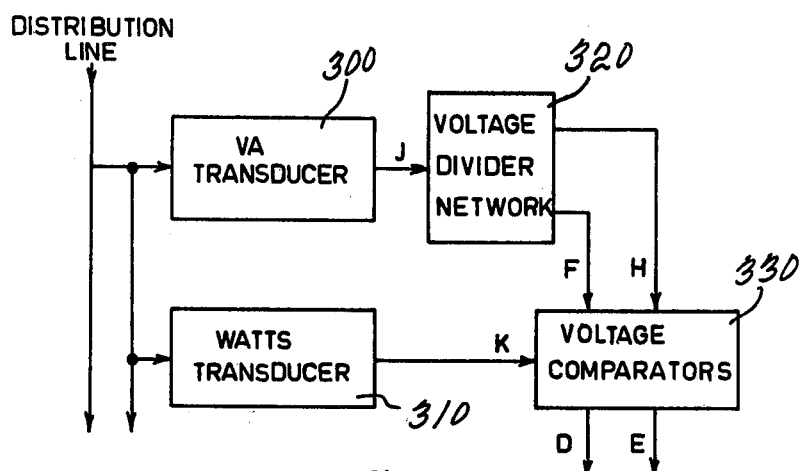
FIG. 5 is a third embodiment of the invention.

FIG. 4 illustrates another configuration of the invention. It is possible to use a single transducer to measure both watts and vars, since a vars transducer is merely a watts transducer with the input potentials shifted through 90°. A phase shifter 205 is therefore connected to the input to transducer 200 in order to obtain, at the output therefrom, a voltage K' proportional to the vars supplied by the network. Thus the watts are measured by transducer 200, and voltage J, obtained, for example, by means of a "sample and hold" amplifier, is retained. Similarly, voltage K' obtained from watts transducer 200, which is proportional to the vars, is also retained by means of another "sample and hold" amplifier. This arrangement makes it possible to obtain two signals J and K' with a single transducer, and this may be an economic advantage, bearing in mind the increase in complexity in the system as a whole.

There are also two other ways of correcting the power factor, both of which are based upon the principle of this present invention. In the first of these (FIG.

5), blocks 100 and 110 respectively in FIG. 1 may be replaced by a VA (volt-amperes) transducer 300 and a watts transducer 310. In this case, block 320 determines the VA fraction that the watts must represent in order to keep the power factor within the desired limits.

Figure 6:
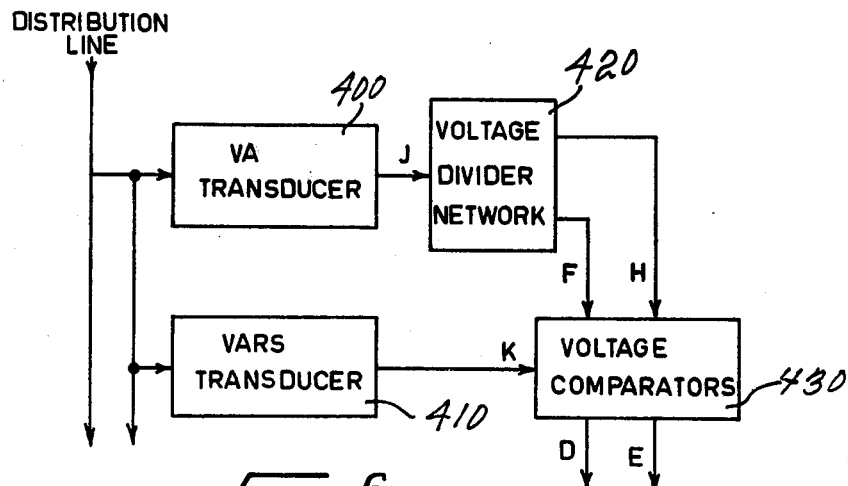
FIG. 6 is a fourth embodiment of the invention.

The second possibility is illustrated in FIG. 6. In this case, blocks 100 and 110 in FIG. 1 are replaced by a VA transducer 400 and a vars transducer 410. Block 420 determines the VA fraction to be represented by the vars at the prescribed limits $L_1$ and $L_2$.

The embodiments of the invention in which an exclusive property or privilege is claimed are defined as follows:

1. A method for regulating the power factor in an electrical distributing-network line, comprising:
    (a) measuring a first component of the line power by means of a transducer, the output from which is a continuous voltage proportional to said component of the power supplied by the line;
    (b) measuring a second component of the line power by means of a transducer, the output from which is a continuous voltage proportional to said second component of the power supplied by the line;
    (c) dividing the voltage supplied by the first component by means of voltage dividers to obtain two voltages $L_1$ and $L_2$, the values of which represent the limits prescribed for the power factor in the line;
    (d) comparing the voltage supplied by the transducer of the second component with reference voltages $L_1$ and $L_2$ to obtain two logic levels indicating one of the following three operations:
    (i) connecting one or more capacitors if the power factor is below said limit $L_1$;
    (ii) disconnecting one or more capacitors if the power factor is above said limit $L_2$;
    (iii) carrying out no operation if the power factor is above said limit $L_1$ and below said limit $L_2$.

2. A method for regulating the power factor in an electrical distributing-network line, consisting in:
    (a) measuring the active power in the line by means of a transducer, the output from which is a continuous voltage proportional to the active power supplied by the line;
    (b) measuring the reactive power in the line by means of a transducer, the output from which is a continuous voltage proportional to the reactive power supplied by the line;
    (c) dividing the voltage supplied by the active-power transducer by means of voltage dividers, in order to obtain two reference voltages $L_1$ and $L_2$, the values of which represent the limits prescribed for the line power factor;
    (d) comparing the voltage supplied by the reactive-power transducer with reference voltages $L_1$ and $L_2$, to obtain two logic levels indicating one of the following three operations:
    (i) connecting one or more capacitors if the power factor is below said limit $L_1$;
    (ii) disconnecting one or more capacitors if the power factor is above said limit $L_2$;
    (iii) carrying out no operation if the power factor is above said limit $L_1$ and below said limit $L_2$.

3. A method for regulating the power factor in an electrical distributing-network line, consisting in:
    (a) measuring the active power in the line by means of a transducer, the output from which is a continuous voltage proportional to the active power supplied by the line;
    (b) retaining the voltage obtained;
    (c) measuring the reactive power in the line by means of said transducer and of a potential phase shifter, to obtain, at the output from the transducer, a second voltage proportional to the reactive power supplied by the line;
    (d) retaining the second voltage obtained;
    (e) dividing the voltage proportional to the active power, in order to obtain two reference voltages $L_1$ and $L_2$, the values of which represent the limits prescribed for the line power factor;
    (f) comparing the second voltage obtained with reference voltages $L_1$ and $L_2$, in order to obtain two logic levels indicating one of the following three operations:
    (i) connecting one or more capacitors if the power factor is below said limit $L_1$;
    (ii) disconnecting one or more capacitors if the power factor is above said limit $L_2$;
    (iii) carrying out no operation if the power factor is above said limit $L_1$ and below said limit $L_2$.

4. A method according to claim 1, 2 or 3, consisting in disconnecting one or more capacitors if the power factor becomes capacitive independently of the value of the power factor in relation to said limits $L_1$ and $L_2$.

5. A method according to claim 1, 2 or 3, comprising a real-time clock determining the period of each capacitor connecting or disconnecting operation.

6. A method according to claim 1, 2 or 3, comprising an alarm indicating that the number of capacitors energized is insufficient.

7. A method according to claim 1, wherein the first component is measured by means of a volt-amperes transducer and the second component is measured by means of a watts transducer.

8. A method according to claim 1, wherein the first component is measured by means of a volt-amperes transducer and the second component is measured by means of a vars transducer.

9. An apparatus for regulating the power factor in an electrical distributing-network line, said apparatus comprising:
    (a) transducer means for measuring a first component of the line power, said means comprising an output representing a continuous voltage proportional to said component of the power supplied by the line;
    (b) transducer means for measuring a second component of the line power, said means comprising an output representing a continuous voltage proportional to said second component of the power supplied by the line;
    (c) means for dividing the voltage supplied by the transducer of the first component, to obtain two reference voltages $L_1$ and $L_2$, the values of which represent the limits prescribed for the line power factor;
    (d) means for comparing the voltage supplied by the transducer of the second component with reference voltages $L_1$ and $L_2$, in order to obtain two logic levels indicating one of the following three operations:
    (i) connecting one or more capacitors if the power factor is below said limit $L_1$;
    (ii) disconnecting one or more capacitors if the power factor is above said limit $L_2$;

(iii) carrying out no operation if the power factor is above said limit $L_1$ and below said limit $L_2$.

10. An apparatus for regulating the power factor in an electrical distributing-network line, said apparatus comprising:
   (a) transducer means for measuring the active power in the line, said means having an output representing a continuous voltage proportional to the active power supplied by the line;
   (b) transducer means for measuring the reactive power in the line, said means having an output representing a continuous voltage proportional to the reactive power supplied by the line;
   (c) means for dividing the voltage supplied by the active-power transducer, in order to obtain two reference voltages $L_1$ and $L_2$, the values of which represent the limits prescribed for the line power factor;
   (d) means for comparing the voltage supplied by the reactive-power transducer with reference voltages $L_1$ and $L_2$, to obtain two logic levels indicating one the following three operations:
      (i) connecting one or more capacitors if the power factor is below said limit $L_1$;
      (ii) disconnecting one or more capacitors if the power factor is above said limit $L_2$;
      (iii) carrying out no operation if the power factor is above said limit $L_1$ and below said limit $L_2$.

11. An apparatus according to claim 10, wherein the divider means comprise two graduated potentiometers to divide the voltage supplied by the active-power transducer, in order to define said reference points $L_1$ and $L_2$.

12. An apparatus according to claim 8 or 9, said apparatus comprising means for determining whether the power factor is capacitive.

13. An apparatus according to claim 10, comprising electronic flip-flops, the purpose of which is to connect and disconnect capacitors in sequence.

14. An apparatus according to claim 13, said apparatus comprising a real-time clock used to determine the period of each electronic flip-flop operation.

15. An apparatus according to claim 10, said apparatus comprising an alarm indicating that the number of capacitors connected is insufficient.

16. An apparatus for regulating the power factor in an electrical distributing-network line, said apparatus comprising: transducer means to measure the active power in the line, said means comprising an output representing a continuous voltage proportional to the active power supplied by the line; means to retain the voltage thus obtained; means for connecting a potential phase-shifter system at the input to said transducer means, for obtaining, at the output from said transducer means, a voltage proportional to the reactive power supplied by the line; means for retaining said voltage proportional to the reactive power; means for dividing the retained voltage proportional to the active power in the line, to obtain two reference voltages $L_1$ and $L_2$; means for comparing the retained voltage proportional to the reactive power in the line with reference voltages $L_1$ and $L_2$, the result of this comparison providing two logic levels indicating one of the following three operations:
   (i) connecting one or more capacitors if the power factor is below said limit $L_1$;
   (ii) disconnecting one or more capacitors if the power factor is above said limit $L_2$;
   (iii) carrying out no operation if the power factor is above said limit $L_1$ and below said limit $L_2$.

17. An apparatus according to claim 9, said apparatus comprising a volt-amperes transducer for measuring the first component and a watts transducer for measuring the second component of the power supplied by the line, said dividing means defining the fraction of the volt-amperes to be represented by the watts in order that the power factor may remain within the limits $L_1$ and $L_2$.

18. An apparatus according to claim 9, said apparatus comprising a volt-amperes transducer for measuring the first component of the power supplied by the line and a vars transducer for measuring the second component of the power supplied by the line, said dividing means defining the fraction of volt-amperes to be represented by the vars at the $L_1$ and $L_2$ limits established.

* * * * *